United States Patent [19]

Wilkendorf

[11] Patent Number: 5,073,260

[45] Date of Patent: Dec. 17, 1991

[54] SWITCHOVER DEVICE

[75] Inventor: Werner Wilkendorf, Ottweiler, Fed. Rep. of Germany

[73] Assignee: HYDAC Filtertechnik GmbH, Sulzbach/Saar, Fed. Rep. of Germany

[21] Appl. No.: 507,495

[22] Filed: Apr. 11, 1990

[30] Foreign Application Priority Data

Jun. 13, 1989 [DE] Fed. Rep. of Germany ... 8907211[U]

[51] Int. Cl.⁵ .............................................. B01D 35/12
[52] U.S. Cl. .................................... 210/238; 210/341; 210/424

[58] Field of Search .......... 210/341, 97, 418, 420–424, 210/100, 106, 232, 424, 323.1, 332, 340, 341, 391, 130, 392, 238; 257/104, 174, 314; 137/269, 614.11, 270, 614.3, 270.5, 614.14, 271, 309, 315, 316, 343, 386, 455, 497, 506, 507, 512.1, 516.25, 528, 529, 530, 535, 560, 625, 571, 802

[56] References Cited

U.S. PATENT DOCUMENTS

3,396,845 8/1968 Bouskill .............................. 210/341

Primary Examiner—Frank Sever
Attorney, Agent, or Firm—Roylance, Abrams, Berdo & Goodman

[57] ABSTRACT

A twin filter comprises two filter housings 11 and 12 which are selectively supplied by a switchover device having a housing 13 with a liquid to be filtered. A closure slide 42 is movable in the housing 13 into two closed positions in which it blocks the supply of the liquid to one of the two filter housings. The closure slide 42 is released from its closed position for displacement into the respective other closed position by a releasing device in the form of a lifting device 48.

19 Claims, 4 Drawing Sheets

SWITCHOVER DEVICE

The invention relates to a switchover device for liquids, in particular for a twin filter for these liquids which is adapted to be switched over. The switchover device comprises a housing with at least one inlet opening and at least two outlet openings for the liquid as well as a closure member movable in the interior of the housing into different closed positions in which it closes one of the outlet openings.

Switchover devices of this kind are required in particular for ensuring that a liquid undergoing special treatment in an apparatus is supplied to a consumer without interruption although the apparatus for carrying out the special treatment has to undergo maintenance occasionally and the treatment has to be interrupted for this purpose.

If there are two outlet openings in the switchover device, the first outlet opening and the second outlet opening are connected to the consumer via a first and a second treating apparatus, respectively. For maintenance purposes, the first outlet opening of the switchover device is then first closed by the closure member so the associated first treating apparatus is out of operation and can undergo maintenance. The second treating apparatus is in operation owing to the flowing of the liquid into it through the second outlet opening. If this second treating apparatus is to be put out of operation for maintenance, the closure member is then moved so as to open the first outlet opening and close the second outlet opening. During this switchover motion, the liquid flows through both treating apparatuses and at the end of the switchover motion only through the first treating apparatus. Owing to closure of the second outlet opening, the second treating apparatus is out of operation and is, therefore, free to undergo maintenance.

A field in which switchover devices of this kind are used is, for example, filter technology. In so-called twin filters, two filters are provided as treating apparatuses and, as described above, are connected to the two outlet openings of the switchover device and to the consumer for, for example, filtered oil.

Another field of use is, for example, the cooling of a consumer with a liquid, for example, in a continuous process. Herein, the liquid heated in the consumer during the cooling could be supplied to a heat exchanger and then fed back to the consumer again for cooling purposes. If it is imperative that the cooling should not be interrupted, the liquid to be cooled can be supplied by such a switchover device alternately via one and two heat exchangers to the consumer.

Depending on the amount of liquid flowing through the switchover device, switchover devices of different sizes are required. The force required for the switchover increases as the size of the switchover devices increases.

The object underlying the invention is to create a switchover device with the features mentioned at the beginning which irrespective of its size in the various fields of use is easy to switch over.

This object is accomplished in accordance with the invention in a switchover device having the features mentioned at the beginning by provision of a releasing device which engages the closure member to release the latter from its closed position.

The invention first resides in the recognition that in order to close an outlet opening, the closure member must sit firmly on the outlet opening and it is also held on this seat by the pressure of the liquid in the housing of the switchover device. Therefore, to enable movement of the closure member at all, this firm seating must be released by, for example, lifting the closure member off the outlet opening. After this release of the closure member from the outlet opening, it can be easily moved into the other closed position.

In an advantageous embodiment of the invention, the closure member is displaceable as closure slide along the inside wall of the housing of the switchover device into the different closed positions, a pressure generating means is provided for pressing the closure slide against the opening to be closed, and a lifting device is provided as releasing device for acting upon the closure slide so as to reduce or eliminate the force with which the closure slide is pressed against the inside wall of the housing of the switchover device. The displaceability of the closure member as closure slide along the inside wall of the housing of the switchover device results in a particularly simple construction for the switchover device. Merely a sliding device is required to displace the closure slide from the one closed position to the other closed position. To achieve particularly simple conditions, the inside wall should be either flat or cylindrical between the two outlet openings as this design of the inside wall permits use of particularly simple guides for the closure slide. Owing to the provision of a pressure generating means, for example, a spring for pressing the closure slide against the opening to be closed, a highly expedient solution for the releasing device is a lifting device, for example, a lifting cylinder by which the force with which the closure member is pressed against the inside wall of the housing of the switchover device can be reduced or eliminated.

Any known device, for example, an electromagnet, an electromotor or the like may be used as lifting device. In an advantageous embodiment of the invention, a lifting cylinder is provided as lifting device.

For actuation of the lifting cylinder, a source of pressure medium and a valve may be provided in an expedient embodiment of the invention for selectively connecting the source of pressure medium with one of the two spaces of the lifting cylinder separated from each other by the piston of the latter.

If the space of the lifting cylinder through which the piston rod extends is connected with the source of pressure medium, i.e., the lifting cylinder attempts to reduce its length as a whole, the lifting cylinder then acts on the closure slide with a force which counteracts the force with which the closure slide is pressed against the inside wall of the housing of the switchover device by the liquid in the housing of the switchover device and/or by springs acting on it. Once the closure slide has reached the other closed position, the space of the lifting cylinder through which the piston rod does not extend is connected with the source of pressure medium of the lifting cylinder so the latter attempts to increase its length as a whole and the closure slide is pressed against the inside wall of the dirt chamber in order to produce a tight closure.

In a further advantageous embodiment of the invention, for actuation of the lifting cylinder, provision is made for its space through which the piston rod extends to be permanently connectable with the interior of the housing of the switchover device and its other space to be selectively connectable by a valve with the interior of the switchover device or with a discharge connection. Hence by connecting the space of the lifting cylinder through which the piston rod does not extend with a discharge connection, the pressure of the liquid in the interior of the housing of the switchover device acts on the piston with a force which reduces or eliminates the force with which the closure slide is pressed against the inside wall of the housing of the switchover device.

The combination of the following features results in a particularly advantageous construction for the switchover device according to the invention:

a) the housing of the switchover device is of circular-cylindrical configuration, b) the closure slide forms a circular-cylindrical closure surface adapted to the circular-cylindrical inside wall of the housing, c) a switching shaft is arranged coaxially with the inside wall of the housing and for actuation protrudes at one end from the housing, d) the closure slide is connected to the switching shaft for movement in the radial direction and is made to rest against the inside wall of the housing by spring force, and e) the end of the lifting device remote from the closure slide is connected to the switching shaft.

When these features are used for a switchover device for filters serving as treating apparatus, an advantageous construction is obtained by the housing of the switchover device comprising a dirt chamber and a clean chamber, by the dirt chamber being provided with an inlet connection piece for the liquid to be filtered and the clean chamber with an outlet connection piece for the filtered liquid and both chambers being provided with connection pieces which connect the dirt and clean chambers of the housing of the switchover device with dirt and clean chambers, respectively, of two filter housings, and by the closure slide selectively closing in its closed positions the connection piece of the dirt chamber of the housing of the switchover device for connection with the dirt chamber of one of the two filter housings.

The invention is explained in detail in the following description of embodiments illustrated in the drawings of an inventive switchover device for twin filters which are adapted to be switched over.

In the embodiment shown in FIGS. 1 to 5, a twin filter adapted to be switched over comprises two filter housings 11 and 12 with a switchover device designated in its entirety 13 arranged between these. The housing 14 of the switchover device 13 is cylindrical and arranged vertically with its axis. The interior of the housing 14 is divided approximately in the middle by a partition 15 into a top dirt chamber 16 and a bottom clean chamber 17. A switching shaft 21, the function of which will be explained in further detail below, is mounted for rotation coaxially with the housing 14 in the top and bottom covers 18 and 19 and also in the partition 15.

Figure 4:
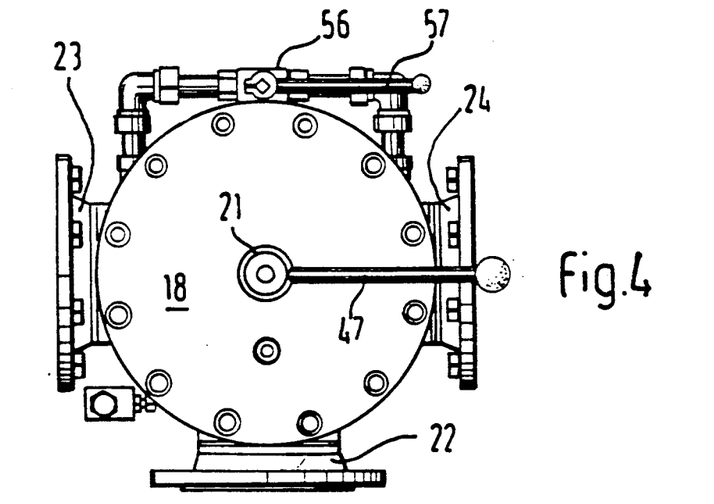
FIG. 4 a plan view in the direction of arrow IV in FIG. 1.
Figure 5:
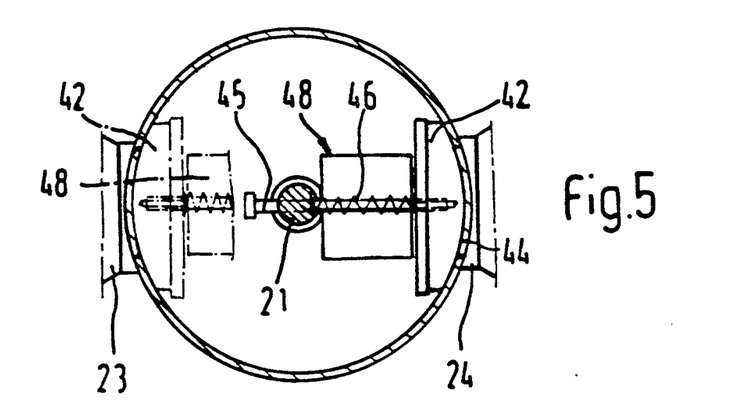
FIG. 5 a section along line V—V in FIG. 1.

As shown in FIG. 4, the housing 14 of the switchover device 13 comprises an inlet connection piece 22 for the liquid to be filtered, for example, mineral oil or the like, opening into the dirt chamber 16 as well as two connection pieces 23, 24 likewise opening into the dirt chamber of the housing 14 and being connectable by a flange connection with corresponding connection pieces 25 and 26, respectively, which open into dirt chambers 27 of the filter housings 11 and 12. Arranged below the connection pieces 23 and 24 are connection pieces 28 and 29, respectively, which open into the clean chamber 17 of the housing 14. These are not visible in FIG. 4 because they are covered by the connection pieces 23 and 24. Like the connection pieces 28 and 29 arranged below the connection pieces 23 and 24, respectively, there is also an outlet connection piece for the filtered liquid which opens into the clean chamber 17 of the housing 14 but is not visible in the drawings.

Figure 1:
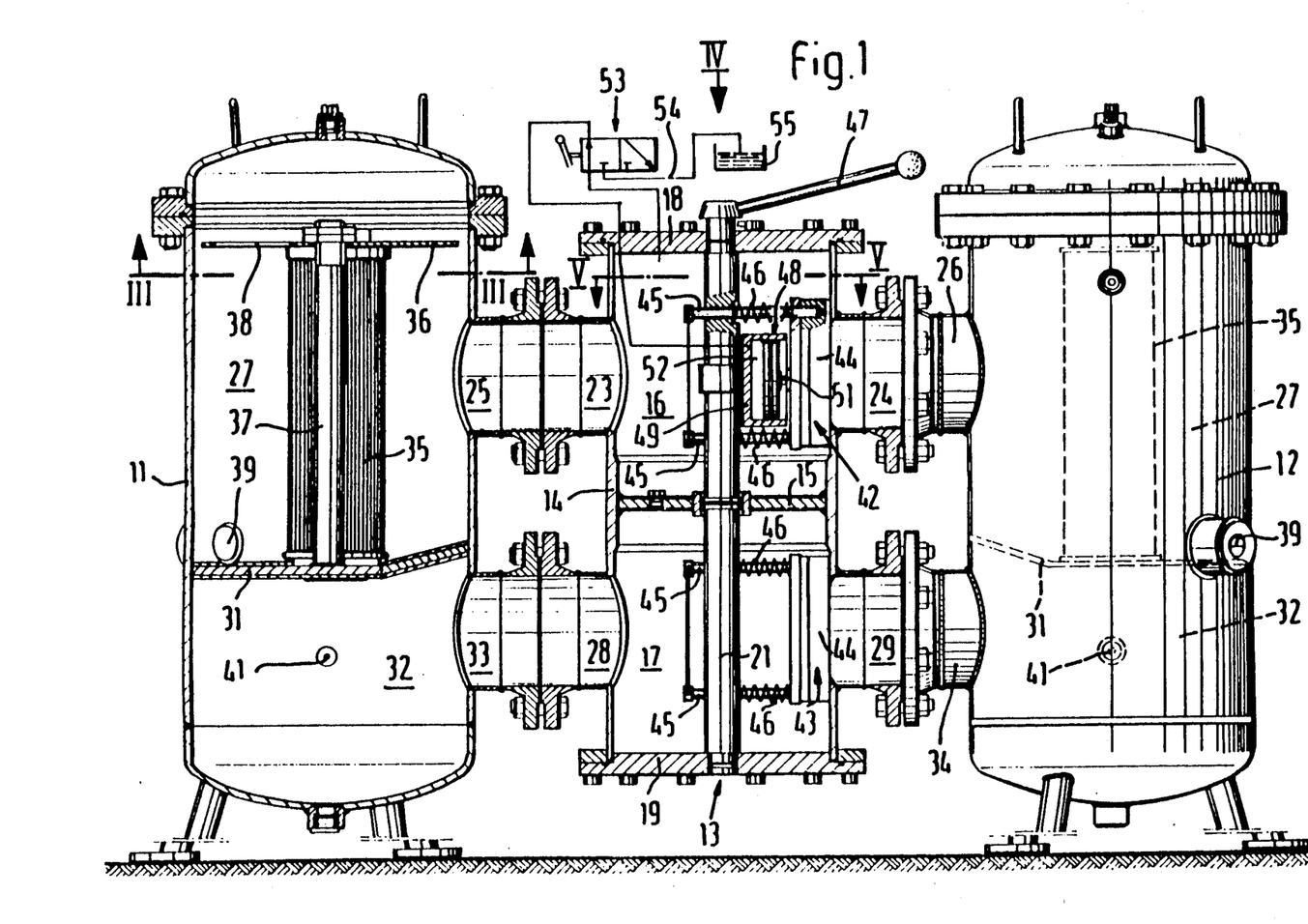
FIGS. 1 and 2 side views illustrated partly in section of a twin filter adapted to be switched over, wherein the valve is adjusted for the closed position of the closure slide and for the switchover position of the closure slide, respectively.

As shown in FIG. 1, the interior of the filter housing 11 is divided by a partition 31 into the above-mentioned dirt chamber 27 and a clean chamber 32 located below the latter. Opening into each of the two clean chambers 32 of the filter housings 11 and 12 is a connection piece 33 and 34, respectively, which is connected by a flange connection to the connection piece 28 and 29, respectively, of the housing 14 of the switchover device 13.

In each of the partitions 31 of the filter housings 11 and 12 there are at least two eccentrically arranged openings for engagement of the outlet connection pieces of commercially available filter elements 35. Only one filter element 35 of these is illustrated in the left filter housing 11 in FIGS. 1, 2 and 6. The filter element 35 comprises a sheet metal casing with cylindrical holes and a filter folded in star-shaped configuration and made of a suitable filtering material, for example, paper or inorganic fibers, surrounding the sheet metal casing.

A circular holding disc 36 is provided for holding the filter element 35 in its seat in the opening of the partition 31. The holding disc 36 is held by a central column 37 which is attached at its bottom end to the partition 31. Recesses 38 are arranged eccentrically around the center of the holding disc 36 for engagement of a projection, not shown in the drawings, at the top end of the filter element 35. As only two filter elements 35 are used in the illustrated embodiment, two of these recesses 38 are used. Each of the two dirt chambers 27 has immediately above the partition 31 a closable outlet opening 39 for cleaning purposes. The clean chamber 32 of each filter housing 11 and 12 contains a likewise closable opening 41 for connection of a pressure measuring instrument.

Only the filter elements 35 of one housing 11 or 12 are used for filtering the liquid introduced through the inlet connection piece 22 into the dirt chamber 16 of the switchover device 13. In the illustration in FIGS. 1, 2 and 5, the openings of the connection pieces 24 and 29 of the housing 14 of the switchover device 13 are closed by closure slides 42 and 43, respectively, in the dirt chamber 16 and the clean chamber 17. Each of these closure slides 42 and 43 has a circular-cylindrical closure surface 44 adapted to the circular-cylindrical inside wall of the housing 14 and held by two holding rods 45 whose free ends are connected to one another. The holding rods 45 are mounted for longitudinal displacement in holes extending diametrically through the switching shaft 21. A compression spring 46 is arranged on each holding rod 45 between the switching shaft 21 and the closure slides 42 and 43. These compression springs 46 press the closure slides 42 and 43 with their closure surfaces 44 against the cylindrical inside wall of the housing 14 and thereby close the mouth of the connection pieces 24 and 29. Arranged at the top end of the switching shaft 21 protruding from the housing 14 is an actuating lever 47 with which the switching shaft 21 can be turned through 180 degrees in the anticlockwise direction in FIG. 4 from the position shown in FIG. 1. The closure slides 42 and 43 are then moved from the closed position shown in FIG. 1 into a second closed position in which they close the openings of the connection pieces 23 and 28 into the dirt and clean chambers of the housing 14. From this second closed position, the switching shaft 21 can then be turned back into the closed position shown in FIG. 1 by swivelling the actuating lever 47 in the clockwise direction.

In the event of the switchover device being of corresponding size and the pressures of the liquid to be filtered in the dirt chamber 16 being high, the frictional force between the closure slide 42 and the inside wall of the dirt chamber 16 is of such size that the lever 47 alone is insufficient for turning the switching shaft 21 and, therefore, a switching gear means is required.

A lifting cylinder 48 is provided for reducing or completely eliminating this frictional force between the closure surface 44 of the closure slide 42 and the inside wall of the dirt chamber 16. The cylinder body of the lifting cylinder 48 is closed at one end by a bottom 49 which is connected to the switching shaft 21 for rotation about the latter. The piston rod 51 of the lifting cylinder 48 is connected to the closure slide 42. The end of the cylinder body of the lifting cylinder 48 remote from the bottom 49 is open towards the dirt chamber 16 and so the pressure acting in the dirt chamber 16 is also present in the space of the lifting cylinder 48 through which the piston rod extends. The other space of the lifting cylinder 48 through which the piston rod 51 does not extend is connected via a line to a 3/2 directional control valve 53 which in the operating position shown in FIG. 1 connects the space 52 with the dirt chamber 16 and so the lifting cylinder 48 is ineffective and the closure slide 42 is pressed against the inside wall of the housing 14 into its closed position by the springs 46 and the liquid to be filtered in the dirt chamber 16. In the second position of the 3/2 directional control valve 53, the space 52 of the lifting cylinder 48 is connected with an discharge connection 54 via which the pressure medium is discharged from the space 52 of the lifting cylinder 48 into a vat 55 so the pressure of the liquid in the dirt chamber 16 presses the piston of the lifting cylinder 48 out of the position shown in FIG. 1 to the left into the position shown in FIG. 2 and thereby exerts on the closure slide 42 a force which counteracts the force of the springs 46 and the force exerted by the liquid in the dirt chamber 16 on the closure slide 42. With corresponding dimensions, the size of this force can be selected such that the closure slide is lifted off the inside wall somewhat so the switchover can then be easily carried out.

As shown in FIG. 4, the two connection pieces 23 and 24 of the housing 14 are connected to one another by a pressure compensating device 56 which can be switched by an actuating lever 57 from the locked position shown in FIG. 4 to an open position for compensation of the pressure in the dirt chambers 27 of the two filter housings 11 and 12.

During the filtering of the liquid introduced through the inlet connection piece 22 by the filter elements 35 in the filter housing 11, the two chambers of the filter housing 12 are also filled with the liquid. When the pressure in the dirt chamber 27 of the filter housing 11 rises above a certain value, for example, 6 bar, owing to soiling of the filter elements 35, this is indicated by a measuring instrument. The switchover device is then switched over into the second closed position in which the liquid to be filtered is then supplied to the dirt chamber of the filter housing 12. For this purpose, the pressure compensating device 56 is first opened in order to bring about a pressure balance between the dirt chamber 16 of the housing 14 of the switchover device 13 and the dirt chamber of the filter housing 12. Since the pressure of, for example, 6 bar in the dirt chamber 27 of the filter housing 11 was caused by the soiling of the filter elements 35, the pressure in the clean chamber 32 of the filter housing 11 and thus also in the clean chamber 17 of the housing 14 of the switchover device is lower, for example, 4 bar. Consequently, there cannot be a complete pressure balance between the dirt chamber 16 of the housing 14 and the dirt chamber of the filter housing 12 because the filter elements 35 in the filter housing 12 are still clean and hence cause a negligible pressure drop as the liquid flows into the clean chamber 32 of the filter housing 12. Therefore, the pressure increase in the dirt chamber 27 of the filter housing 12 caused by the opening of the pressure compensating device 56 only reaches a value which exceeds the pressure in the clean chamber of the housing 14 by such an amount that the pressure increase is sufficient to lift the closure slide 43 of the clean chamber 17 off the inside wall. This pressure increase results in a pressure of, for example, 4.1 bar in the filter housing 12. This means that the closure slide 42 in the dirt chamber 16 of the housing 14 is still not pressed by the spring 46 only but also by the excess pressure of the liquid in the dirt chamber 16 against the inside wall of the housing 14.

Figure 2:
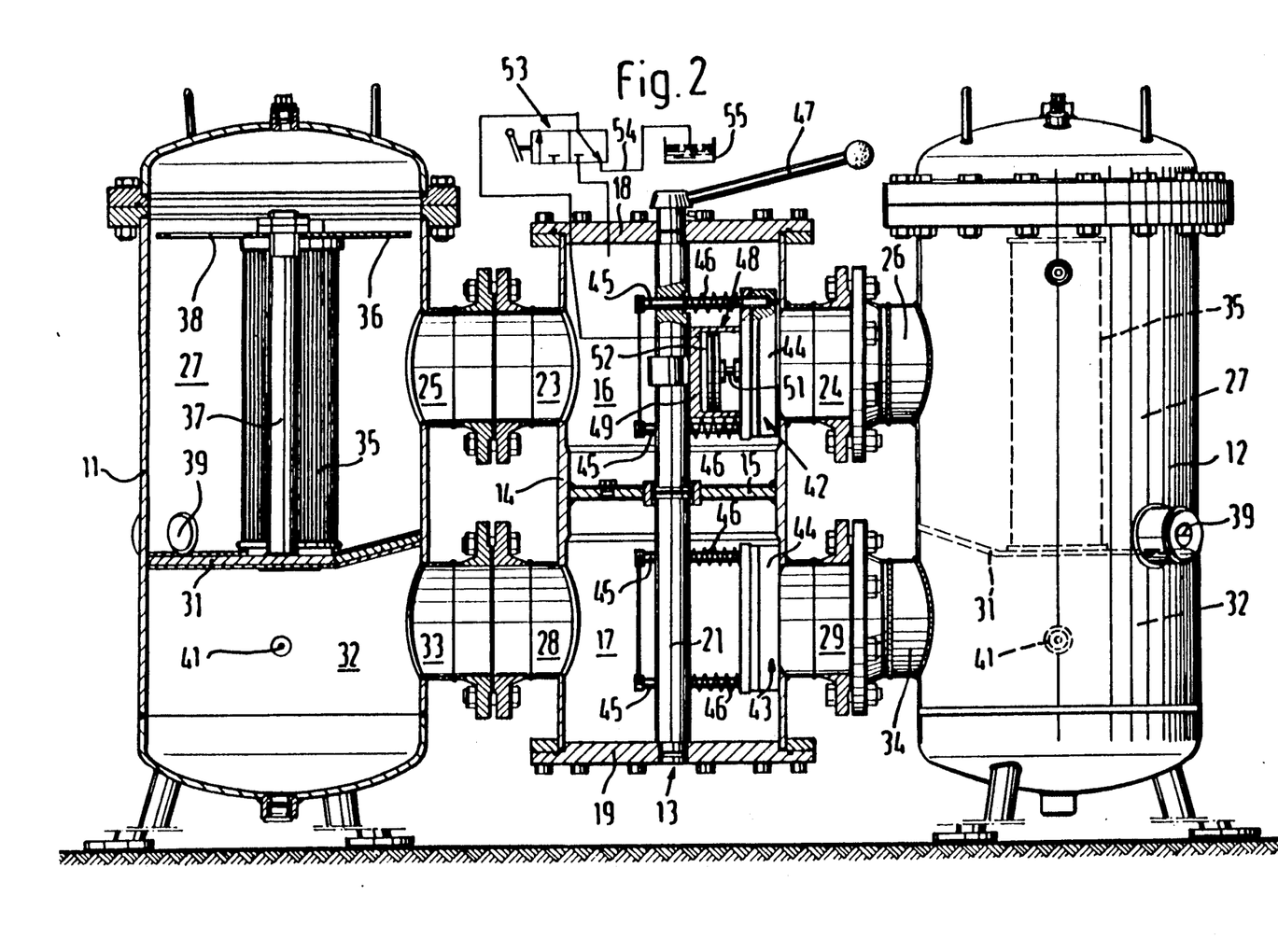
Figure 3:
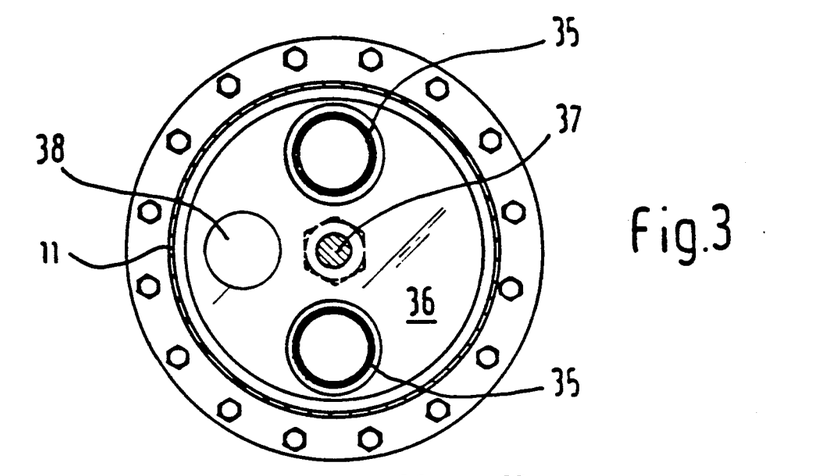
FIG. 3 a section along line III—III in FIG. 1.

When the 3/2 directional control valve is now switched over into its second position shown in FIG. 2, the space 52 of the lifting cylinder 48 is then connected with the vat 55 so the full pressure in the dirt chamber 16 acts on the piston of the lifting cylinder 48 and in the event of the lifting cylinder having corresponding dimensions, lifts the closure slide 42 slightly off the inside wall of the housing 14. The switching shaft 21 can now be easily turned by the actuating lever 47 through 180 degrees into a position in which the closure slides 42 and 43 are in the diametrically opposed positions in which they close the openings of the connection pieces 23 and 28 into the dirt chamber 16 and the clean chamber 17, respectively.

During this switching operation, the liquid to be filtered still flows partially through the filter housing 11 and to an increasing extent through the filter housing 12 until it finally flows through the filter housing 12 only. Hence the filtering of the liquid is not interrupted during this switchover operation. The switchover operation requires only a small force as the closure slide 42 is lifted off the inside wall during the switchover operation.

In a modification, not illustrated in the drawings, a lifting cylinder of the same design may also be provided for the closure slide 44 in the clean chamber 17.

Figure 6:
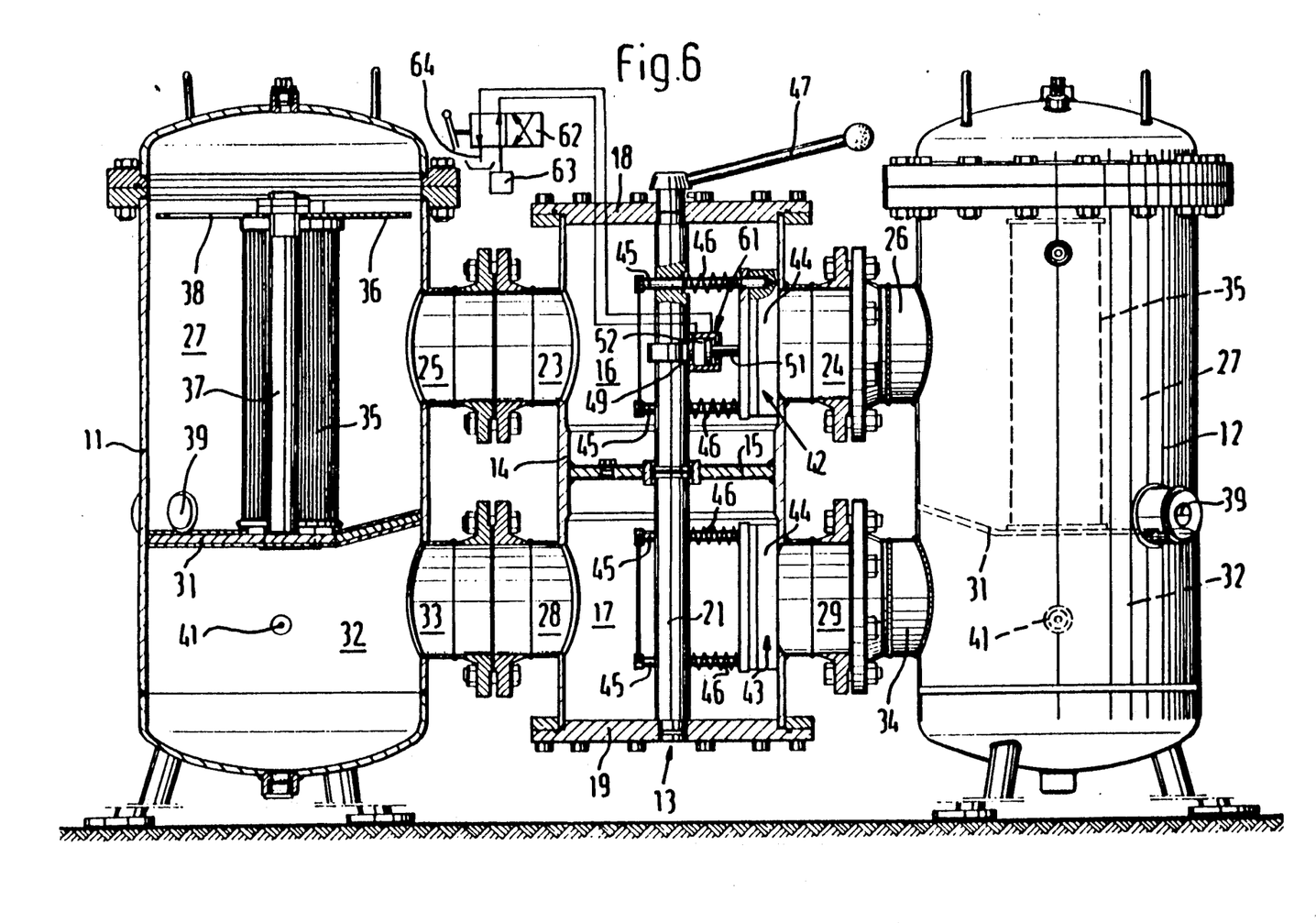
FIG. 6 an illustration corresponding to FIG. 1 of the second embodiment.

The second embodiment illustrated in FIG. 6 differs from the first embodiment described above in that a lifting cylinder 61 is provided herein with its cylinder body closed at both of its ends and both of its cylinder spaces connected to a 4/2 directional control valve 62 by means of which the one cylinder space of the lifting cylinder 61 is connectable with an external source of pressure medium 63, for example, with the pressure connection piece of a pressure medium pump, and the other cylinder space with a return flow connection 64, for example, with a vat or the suction connection piece of the pump, and vice-versa. In this way, the closure slide 42 can be selectively pressed against or lifted off the inside wall of the housing 14 by the power of the source of pressure medium 63.

Here, too, in a modified embodiment, an identical lifting cylinder 61 may be provided for the closure slide 43 in the clean chamber of the housing 14.

The foregoing description and the drawings relate to the features which are essential to the materialization, by way of example, of the invention. Therefore, insofar as features are disclosed in the description and drawings but are not mentioned in the claims, these serve, if necessary, to also define the subject of the invention.

What is claimed is:

1. A switchover device for controlling flow of a liquid, comprising:
    a housing with a wall surrounding an interior space of said housing by an interior surface;
    a housing with a wall surrounding an interior space of said housing by an interior surface;
    at least one inlet opening and at least two outlet openings in said wall for liquid flow, each of said outlet openings being surrounded by a rim facing said interior space;
    a closure means with a closure surface facing said interior surface of said wall and surrounded by a rim for closely and selectively contacting said rim of each of said outlet openings, said closure means being movable from a first closing position at one of said outlet openings to a second closing position at the other of said outlet openings;
    pressing means for producing a force pressing said rim of said closure means into close contact with said rims of said outlet openings when said closure means is in said closing positions covering said outlet openings;
    releasing means for releasing said closure means from said close contact; and
    operating means for moving said closure means from one of the closing positions to the other of said closing positions.

2. A switchover device as defined in claim 1 wherein said interior surface is a circular-cylindrical configuration having an axis and surrounding a space having two ends closed by two cover means; and
    said rim of said closure means has a circular-cylindrical configuration conforming to said circular-cylindrical configuration of said interior surface so that said closure means is shiftable along said interior surface of said wall when released from said outlet openings by said releasing means.

3. A switchover device as defined in claim 2 wherein said releasing means comprises a means for reducing said force produced by said pressing means.

4. A switchover device as defined in claim 2 wherein said operating means comprises a shaft having a longitudinal axis which coincides with said axis of said interior surface, said shaft being rotatably mounted in said two cover means, said closure means being connected to said shaft for a movement in a radial direction relative to said shaft, said pressing means and said releasing means being arranged for acting between said shaft and said closure means.

5. A switchover device as defined in claim 4 wherein said releasing means comprises a lifting cylinder means having a cylinder and a piston, said piston being movable in said cylinder and separating two cylinder chambers in said cylinder from each other, said cylinder and said piston forming two parts of said lifting cylinder means, one of said parts being connected to said shaft, the other of said parts being connected to said closure means, said two cylinder chambers being selectively connectable with a pressure medium source and to a return flow connection by a valve means for actuation of said lifting cylinder means by pressure medium for selectively releasing and pressing said closure means respectively from and to one of said outlet openings.

6. A switchover device as defined in claim 5 wherein said outlet openings are respectively coupled to two separate filter units;
    said interior space is divided by a dividing wall into first and second rooms, said first room receiving unfiltered liquid flow through said inlet opening and conducting the unfiltered liquid flow through an open one of said two outlet openings into the respective one of said two filter units, dependent on the closing position of said closure means, said second room receiving filtered liquid flow from the respective one of said two filter units; and
    said second room has two inlet openings for receiving the filtered liquid flow from said two filter units, an outlet opening for conducting the filtered liquid flow out of said second room, and a second closure means for closing one of said two inlet openings of said second room, said operating means being connected to both of said closure means for simultaneously closing of one of said outlet openings of said first room and of the corresponding one of said inlet openings of said second room;
    whereby liquid flow can be selectively switched from one of said filter units to the other of said filter units.

7. A switchover device as defined in claim 5 wherein said outlet openings are respectively coupled to two separate filter units;
    said interior space is divided by a dividing wall into first and second rooms, said first room receiving unfiltered liquid flow through said inlet opening and conducting the unfiltered liquid flow through an open one of said two outlet openings into one of said filter units, dependent on the closing position of said closure means, said second room receiving filtered liquid flow from said one of said two filter units;
    said dividing wall extends perpendicularly to said axis of said interior surface;
    said shaft extends through said dividing wall and said second room;
    said second room has two inlet openings for receiving the filtered liquid flow from said two filter units, an outlet opening for conducting the filtered liquid flow out of said second room, and a second closure means for closing one of said two inlet openings of said second room, said second closure means being connected to said shaft for simultaneous movement of said two closure means;

whereby liquid flow can be selectively switched from one of said filter units to the other of said filter units.

8. A switchover device as defined in claim 4 wherein said releasing means comprises a lifting cylinder means having a cylinder and a piston with a piston rod, said piston being movable in said cylinder and separating a first cylinder chamber from a second cylinder chamber in said cylinder, said piston rod extending through said first cylinder chamber and out of said cylinder, said cylinder and said piston forming two parts of said lifting cylinder means, one of said parts being connected to said shaft, the other of said parts being connected to said closure means, said first cylinder chamber being permanently connected to said interior space of said housing, said second cylinder chamber being selectively connectable with said interior space and a discharge opening by a valve means;

whereby, when liquid flow produces a liquid pressure in said interior space, said piston is moved by an excess force produced by said liquid pressure in one of said second cylinder chamber and said first cylinder chamber for actuating said lifting cylinder means by said liquid pressure for releasing and for pressing said closure means from and to one of said outlet openings, respectively.

9. A switchover device as defined in claim 8 wherein
said outlet openings are respectively coupled to two separate filter units;
said interior space is divided by a dividing wall into first and second rooms, said first room receiving unfiltered liquid flow through said inlet opening and conducting the unfiltered liquid flow through an open one of said two outlet openings into the respective one of said two filter units, dependent on the closing position of said closure means, said second room receiving filtered liquid flow from the respective one of said two filter units; and
said second room has two inlet openings for receiving the filtered liquid flow from said two filter units, an outlet opening for conducting the filtered liquid flow out of said second room, and a second closure means for closing one of said two inlet openings of said second room, said operating means being connected to both of said closure means for simultaneously closing of one of said outlet openings of said first room and of the corresponding one of said inlet openings of said second room;
whereby liquid flow can be selectively switched from one of said filter units to the other of said filter units.

10. A switchover device as defined in claim 8 wherein
said outlet openings are respectively coupled to two separate filter units;
said interior space is divided by a dividing wall into first and second rooms, said first room receiving unfiltered liquid flow through said inlet opening and conducting the unfiltered liquid flow through an open one of said two outlet openings into one of said filter units, dependent on the closing position of said closure means, said second room receiving filtered liquid flow from said one of said two filter units;
said dividing wall extends perpendicularly to said axis of said interior surface;
said shaft extends through said dividing wall and said second room;
said second room has two inlet openings for receiving the filtered liquid flow from said two filter units, an outlet opening for conducting the filtered liquid flow out of said second room, and a second closure means for closing one of said two inlet openings of said second room, said second closure means being connected to said shaft for simultaneous movement of said two closure means;
whereby liquid flow can be selectively switched from one of said filter units to the other of said filter units.

11. A switchover device as defined in claim 4 wherein said shaft has an end which extends through one of said two cover means, said end having actuating means for rotating said shaft to move said closure means from one outlet opening to the other outlet opening.

12. A switchover device as defined in claim 11 wherein said actuating means comprises a lever connected to said end of said shaft for manual rotation of said shaft.

13. A switchover device as defined in claim 11 wherein
said outlet openings are respectively coupled to two separate filter units;
said interior space is divided by a dividing wall into first and second rooms, said first room receiving unfiltered liquid flow through said inlet opening and conducting the unfiltered liquid flow through an open one of said two outlet openings into one of said filter units, dependent on the closing position of said closure means, said second room receiving filtered liquid flow from said one of said two filter units;
said dividing wall extends perpendicularly to said axis of said interior surface;
said shaft extends through said dividing wall and said second room;
said second room has two inlet openings for receiving the filtered liquid flow from said two filter units, an outlet opening for conducting the filtered liquid flow out of said second room, and a second closure means for closing one of said two inlet openings of said second room, said second closure means being connected to said shaft for simultaneous movement of said two closure means;
whereby liquid flow can be selectively switched from one of said filter units to the other of said filter units.

14. A switchover device as defined in claim 4 wherein
said outlet openings are respectively coupled to two separate filter units;
said interior space is divided by a dividing wall into first and second rooms, said first room receiving unfiltered liquid flow through said inlet opening and conducting the unfiltered liquid flow through an open one of said two outlet openings into one of said filter units, dependent on the closing position of said closure means, said second room receiving filtered liquid flow from said one of said two filter units;
said dividing wall extends perpendicularly to said axis of said interior surface;
said shaft extends through said dividing wall and said second room;
said second room has two inlet openings for receiving the filtered liquid flow from said two filter units, an outlet opening for conducting the filtered liquid flow out of said second room, and a second closure means for closing one of said two inlet openings of said second room, said second closure means being connected to said shaft for simultaneous movement of said two closure means;

whereby liquid flow can be selectively switched from one of said filter units to the other of said filter units.

15. A switchover device as defined in claim 4 wherein said outlet openings are respectively coupled to two separate filter units;

said interior space is divided by a dividing wall into first and second rooms, said first room receiving unfiltered liquid flow through said inlet opening and conducting the unfiltered liquid flow through an open one of said two outlet openings into the respective one of said two filter units, dependent on the closing position of said closure means, said second room receiving filtered liquid flow from the respective one of said two filter units; and said second room has two inlet openings for receiving the filtered liquid flow from said two filter units, an outlet opening for conducting the filtered liquid flow out of said second room, and a second closure means for closing one of said two inlet openings of said second room, said operating means being connected to both of said closure means for simultaneously closing of one of said outlet openings of said first room and of the corresponding one of said inlet openings of said second room;

whereby liquid flow can be selectively switched from one of said filter units to the other of said filter units.

16. A switchover device as defined in claim 2 wherein said outlet openings are respectively coupled to two separate filter units;

said interior space is divided by a dividing wall into first and second rooms, said first room receiving unfiltered liquid flow through said inlet opening and conducting the unfiltered liquid flow through an open one of said two outlet openings into the respective one of said two filter units, dependent on the closing position of said closure means, said second room receiving filtered liquid flow from the respective one of said two filter units; and said second room has two inlet openings for receiving the filtered liquid flow from said two filter units, an outlet opening for conducting the filtered liquid flow out of said second room, and a second closure means for closing one of said two inlet openings of said second room, said operating means being connected to both of said closure means for simultaneously closing of one of said outlet openings of said first room and of the corresponding one of said inlet openings of said second room;

whereby liquid flow can be selectively switched from one of said filter units to the other of said filter units.

17. A switchover device as defined in claim 1 wherein said pressing means comprises at least one spring for producing said force.

18. A switchover device as defined in claim 1 wherein said releasing means comprises a lifting means.

19. A switchover device as defined in claim 1 wherein said outlet openings are respectively coupled to two separate filter units;

said interior space is divided by a dividing wall into first and second rooms, said first room receiving unfiltered liquid flow through said inlet opening and conducting the unfiltered liquid flow through an open one of said two outlet openings into the respective one of said two filter units, dependent on the closing position of said closure means, said second room receiving filtered liquid flow from the respective one of said two filter units; and said second room has two inlet openings for receiving the filtered liquid flow from said two filter units, an outlet opening for conducting the filtered liquid flow out of said second room, and a second closure means for closing one of said two inlet openings of said second room, said operating means being connected to both of said closure means for simultaneously closing of one of said outlet openings of said first room and of the corresponding one of said inlet openings of said second room;

whereby liquid flow can be selectively switched from one of said filter units to the other of said filter units.

* * * * *

UNITED STATES PATENT AND TRADEMARK OFFICE
CERTIFICATE OF CORRECTION

PATENT NO. : 5,073,260
DATED : December 17, 1991
INVENTOR(S) : Werner Wilkendorf It is certified that error appears in the above-identified patent and that said Letters Patent is hereby corrected as shown below:

In column 7, lines 25-26 should be deleted in their entirety.

Signed and Sealed this

Thirteenth Day of April, 1993

Attest:

STEPHEN G. KUNIN

*Attesting Officer*   *Acting Commissioner of Patents and Trademarks*